United States Patent
Ao et al.

(10) Patent No.: US 9,147,168 B1
(45) Date of Patent: Sep. 29, 2015

(54) DECISION TREE REPRESENTATION FOR BIG DATA

(71) Applicant: EMC Corporation, Hopkinton, MA (US)

(72) Inventors: Jianwang Ao, Beijing (CN); Yi Ren, Beijing (CN); Guangxin Yang, Beijing (CN); Caleb Welton, Foster City, CA (US)

(73) Assignee: EMC CORPORATION, Hopkinton, MA (US)

( * ) Notice: Subject to any disclaimer, the term of this patent is extended or adjusted under 35 U.S.C. 154(b) by 307 days.

(21) Appl. No.: 13/722,780

(22) Filed: Dec. 20, 2012

(51) Int. Cl.
  *G06F 17/00* (2006.01)
  *G06F 17/20* (2006.01)
  *G06N 99/00* (2010.01)

(52) U.S. Cl.
  CPC .................................. *G06N 99/005* (2013.01)

(58) Field of Classification Search
  None
  See application file for complete search history.

(56) References Cited

U.S. PATENT DOCUMENTS

| | | | |
|---|---|---|---|
| 7,155,421 B1 * | 12/2006 | Haldar | 706/46 |
| 2007/0179966 A1 | 8/2007 | Li et al. | |
| 2007/0185896 A1 | 8/2007 | Jagannath et al. | |
| 2007/0192341 A1 * | 8/2007 | Thomas et al. | 707/100 |
| 2010/0094800 A1 * | 4/2010 | Sharp | 706/55 |
| 2010/0153324 A1 * | 6/2010 | Downs et al. | 706/21 |
| 2011/0307423 A1 | 12/2011 | Shotton et al. | |
| 2013/0044924 A1 | 2/2013 | Spencer | |
| 2013/0246698 A1 | 9/2013 | Estan et al. | |
| 2014/0136452 A1 | 5/2014 | Wellman et al. | |

OTHER PUBLICATIONS

Taniar et al. "High Performance Parallel Database Processing and Grid Databases", Chapter 7, Wiley, 2008, pp. 38.*
Caragea et al., A Framework for Learning from Distributed Data Using Sufficient Statistics and its Application to Learning Decision Trees, 2004, pp. 10, J. His.
Graefe et al., On the Efficient Gathering of Sufficient Statistics for Classification from Large SQL Databases, 1998, pp. 5, AAAI.

\* cited by examiner

*Primary Examiner* — Li-Wu Chang
(74) *Attorney, Agent, or Firm* — John Gould; Theodore A. Chen; Krishnendu Gupta

(57) ABSTRACT

A method, system, and process for representing a decision tree in a tabular format is discussed. The format may contain all the necessary information to traverse the nodes in parallel on a distributed system while consuming an efficient amount of resources. In some embodiments, the tree may be stored in a relational database as a table.

20 Claims, 9 Drawing Sheets

DECISION TREE REPRESENTATION FOR BIG DATA

CROSS REFERENCE TO RELATED APPLICATIONS

This application is related to co-pending U.S. patent application Ser. No. 13/722,847 for GENERATING ATTRIBUTE-CLASS-STATISTICS FOR DECISION TREES and filed concurrently herewith, which is incorporated herein by reference for all purposes. This application is related to co-pending U.S. patent application Ser. No. 13/722,747 for EFFICIENT AND SCALABLE METHOD FOR CALCULATING SPLIT CRITERION VALUES DURING DECISION TREE TRAINING and filed concurrently herewith, which is incorporated herein by reference for all purposes. This application is related to co-pending U.S. patent application Ser. No. 13/722,864 for DECISION TREE CLASSIFICATION FOR BIG DATA and filed concurrently herewith, which is incorporated herein by reference for all purposes.

FIELD OF THE INVENTION

This invention relates generally to data analytics, and more particularly to systems and methods for building decision trees.

BACKGROUND OF THE INVENTION

Decision trees and random forests are classification tools used to categorize data. These trees may classify dataset records and/or predict consequences or events. For example, a decision tree may consider attributes such as temperature, humidity, outlook and windy to determine whether a specific combination of the four aforementioned attribute values is favorable to a round of golf.

Traditionally, the amount of memory and processing power required to build or train a decision tree is proportionate to the size of the data used for training and/or the resultant tree. As data size increases, so does the amount of required resources. When dealing with big data, such as a large database, this proportionate growth may present significant concerns since training large trees may become cost prohibitive. Further, training algorithms may not scale efficiently on a distributed architecture, such as a massive parallel processing, shared nothing database.

Additionally, classifying data may be similarly cost prohibitive. Classifying the dataset may require both the dataset and the decision tree to be loaded into memory, and memory requirements may therefore be proportionate to the size of the training dataset and/or the trained tree. Like training algorithms, classification algorithms may also not scale efficiently on a distributed architecture.

There is a need, therefore, for an improved method, system, and process for building decision trees and classifying datasets on a distributed architecture.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
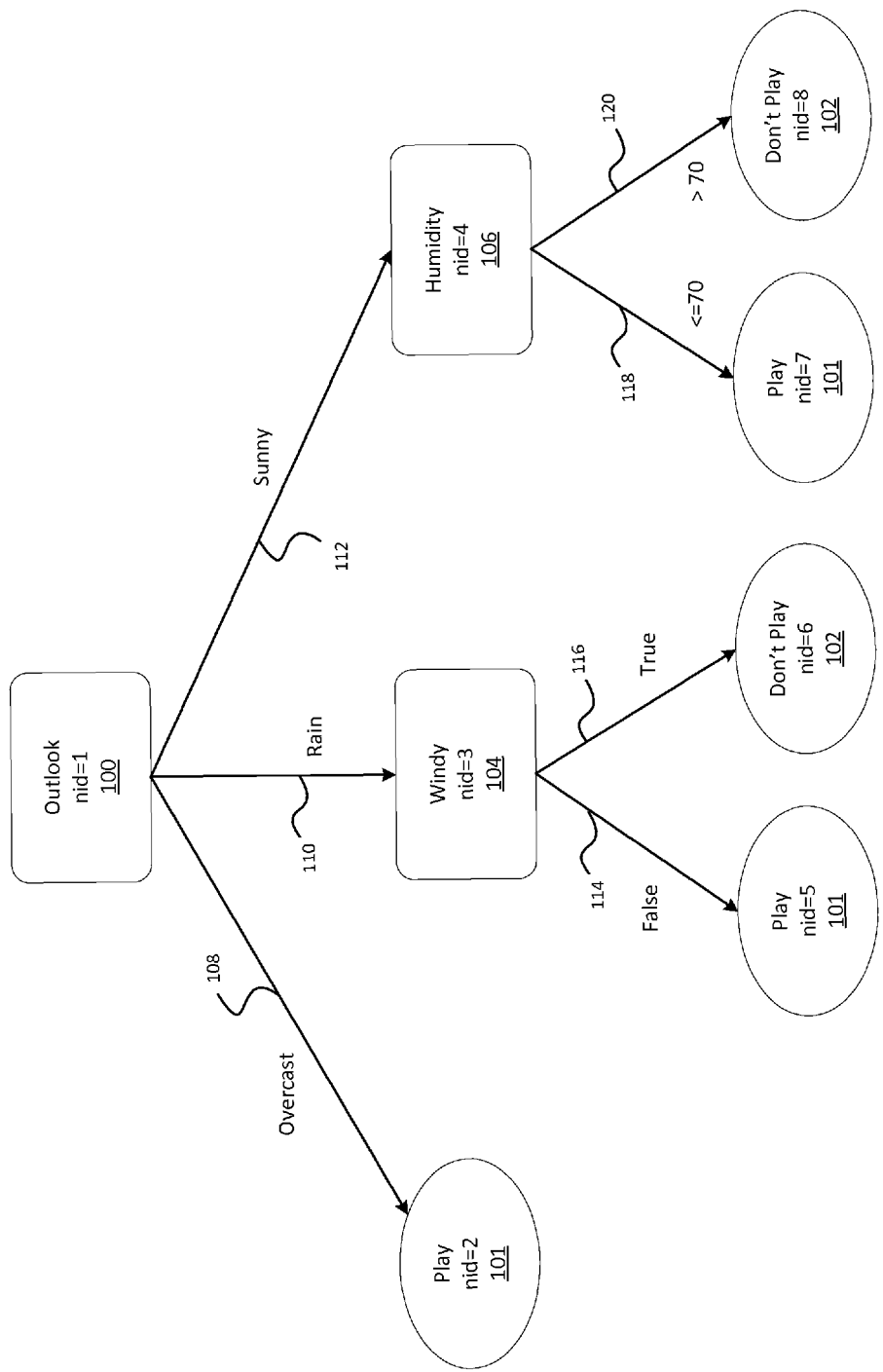
FIG. 1 depicts a decision tree consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general-purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses methods and systems for training decision trees and classifying information. In an embodiment, a novel decision tree format may be leveraged to categorize data on a scalable, distributed platform, such as a massive parallel processing shared nothing database. The decision tree format may be generated from a training set using attribute class statistics ("ACS"), which are thereafter used to calculate split criterion values (SCV) for individual nodes in the tree. In some embodiments, these training and/or classification processes may consume a constant amount of memory. Additionally or alternatively, the processes may run in parallel on a distributed system architecture, such as an MPP shared-nothing database. This may be particularly beneficial in the context of big data, where systems may need to be scaled as datasets grow or shrink.

Decision Tree Formats

Turning now to FIG. 1, a simple decision tree is shown for reference. The decision tree in FIG. 1 may be used to determine whether conditions are favorable to play a round of golf. The tree includes decision nodes 100, 104, and 106, and outcome nodes 101 and 102. Each decision node considers an attribute and makes a decision based on the value. For example, outlook node 100 considers whether it is overcast, rainy, or sunny. If it is overcast, branch 108 is traversed and the outcome node "play" is reached. If the attribute value is rainy, branch 110 may be traversed and the windy attribute is analyzed at node 104. If the windy attribute is false, branch 114 may be traversed and outcome node "play" is reached. If the windy attribute is true, branch 116 is traversed and outcome node "don't play" is reached. In other words, if it is rainy and windy the decision tree would advise not to play a round of golf. Similarly, if the outlook attribute is sunny, branch 112 may be traversed and humidity may be considered at 106. If the humidity is less than or equal to 70%, branch 118 may be followed and a "play" outcome node is reached. If the humidity is greater than 70%, branch 120 may be traversed and a "don't play" outcome node is reached.

Decision trees, such as the tree shown in FIG. 1, may be built from a training set. Training sets may be a set of attributes and values that have already been classified. Since the attributes and their values have already been assigned a class, the decision tree may use the values to make future predictions. In an embodiment, the more detailed the training set the more accurate a decision tree's classifications may be.

For example, Table 1 depicts a training set that may be used to train a tree similar to the one shown in FIG. 1. Table 1 includes fourteen records with unique id's, a class, and attribute values for outlook, temperature, humidity and windy. Class corresponds to possible outcomes. For example, in Table 1 "play" may be codified as the number 2 and "don't play" may be codified as the number 1. In some embodiments, certain attributes may not be chosen as a splitting attribute in a trained tree. For example, temperature may not be chosen as a best splitting attribute. Therefore, it is not included in the decision tree shown in FIG. 1.

TABLE 1

| id | outlook | temperature | humidity | windy | class |
|----|---------|-------------|----------|-------|-------|
| 1  | 3       | 85          | 85       | 1     | 1     |
| 2  | 3       | 80          | 90       | 2     | 1     |
| 3  | 1       | 83          | 78       | 1     | 2     |
| 4  | 2       | 70          | 96       | 1     | 2     |
| 5  | 2       | 68          | 80       | 1     | 2     |
| 6  | 2       | 65          | 70       | 2     | 1     |
| 7  | 1       | 64          | 65       | 2     | 2     |
| 8  | 3       | 72          | 95       | 1     | 1     |
| 9  | 3       | 69          | 70       | 1     | 2     |
| 10 | 2       | 75          | 80       | 1     | 2     |
| 11 | 3       | 75          | 70       | 2     | 2     |
| 12 | 1       | 72          | 90       | 2     | 2     |
| 13 | 1       | 81          | 75       | 1     | 2     |
| 14 | 2       | 71          | 80       | 2     | 1     |

In some embodiments, attributes may be classified as discrete or continuous. Discrete attributes may be bounded and/or encoded as integers. For example, "windy" is a discrete attribute because it is either true, encoded as 2, or false, encoded as 1. Similarly, "outlook" is a discrete attribute because is either overcast (1), rainy (2), or sunny (3). Continuous attribute may be unbounded and/or encoded as decimals. For example, temperature may have a range from absolute zero to infinity, and is therefore continuous. Similarly, humidity may range from 0 to 100%, including any decimal in between, and is therefore also continuous.

As the size of the training dataset and the decision trees grow, the amount of resources needed to train the tree and classify datasets may also grow. For small trees, such as the tree shown in FIG. 1, resources may not be a concern. Trees trained from or used to classify big data, however, may consume an unacceptably high amount of resources. The tree format depicted in Table 2 may help reduce these resource costs.

TABLE 2

| tid | nid | tree_loc | aid | iscont | sp_val | maxclass | node_size | prob   | scv   | pid | lmc_nid | lmc_fval | dp_ids |
|-----|-----|----------|-----|--------|--------|----------|-----------|--------|-------|-----|---------|----------|--------|
| 1   | 1   | {0}      | 1   | f      |        | 2        | 14        | 0.6429 | 0.171 | 0   | 2       | 1        |        |
| 1   | 2   | {0,1}    |     |        |        | 2        | 4         | 1      | 0     | 1   |         |          | {1}    |
| 1   | 3   | {0,2}    | 3   | f      |        | 2        | 5         | 0.6    | 0.673 | 1   | 5       | 1        | {1}    |
| 1   | 5   | {0,2,1}  |     |        |        | 2        | 3         | 1      | 0     | 3   |         |          | {1,3}  |
| 1   | 6   | {0,2,2}  |     |        |        | 1        | 2         | 1      | 0     | 3   |         |          | {1,3}  |
| 1   | 4   | {0,3}    | 4   | t      | 70     | 1        | 5         | 0.6    | 0.673 | 1   | 7       | 1        | {1}    |
| 1   | 7   | {0,3,1}  |     |        |        | 2        | 2         | 1      | 0     | 4   |         |          | {1}    |
| 1   | 8   | {0,3,2}  |     |        |        | 1        | 3         | 1      | 0     | 4   |         |          | {1}    |

Table 2 is a tabular representation of the decision tree shown in FIG. 1, and may be generated from a training set similar to Table 1. This tabular format may be stored in a database, and in an embodiment may be distributed to multiple nodes in a database cluster. Additionally, the format may contain all the information needed to classify a given dataset, as discussed in detail below. This information may be divided into the following fourteen elements, each of which corresponds to a column in Table 2.

"tid" is a unique identifier assigned to the tree to which a given node belongs. In the present example, tid is set to 1 for every node because Table 2 only includes 1 tree (i.e. the tree shown in FIG. 1). In some embodiments, however, trees may be collected together to form a random forest. In such an embodiment, tid may uniquely identify each tree in the forest. This may allow all the nodes in a random forest to be stored in a single data table and/or file, which may in turn conserve system storage space.

"nid" is a unique identifier for a tree node. In an embodiment, every node in a tree has a unique nid, and the nid and tid taken together may identify specific nodes in a random forest. In some embodiments, "nid" order may be based on a breadth first traversal of the decision tree. For example, with reference to Table 2 and FIG. 1, root decision node 100 has nid 1 and is the first record in Table 2. The "play" outcome node linked to node 100 by branch 108 has nid 2, and decision nodes 104 and 106 have nid's 3 and 4 respectively. This breadth first labeling continues until all eight nodes of the decision tree have a unique nid.

"pid" is the nid of a node's parent. For example, decision node 104 has a pid equal to 1 since its parent node is the root node. Root nodes may have a pid equal to 0, or may not have any pid.

"lmc_nid" may be the nid assigned to a node's leftmost child. For example, in FIG. 1 the leftmost child of the root node is the "play" outcome node on branch 108. Since that node's nid is 2, lmc_nid is set to 2 for the root node. In an embodiment, the nid's of child nodes are continuous. This may result, for example, from the breadth first nid assignment strategy. Additionally, the number of children a given node has may always be known. For discrete attributes, the number of children is equal the number of distinct attribute values. For example, outlook has three distinct values (overcast, rainy, or sunny), and therefore has three children. For continuous attributes, the number of children may always be two. For example, humidity has a single split value of 70, and therefore has two children. Since a node always knows the leftmost child nid and the number of children, it does not need to store the nid's for all of the children. A given child node may be quickly identified by adding an index number to the lmc_nid. For example, the nids of the outlook node's children are 2 (lmc_nid), 3 (lmc_nid+1), and 4 (lmc_nid+2). This process is discussed in further detail below. For large trees, storing a single child node may significantly reduce storage space requirements.

"lmc_fval" is a node's leftmost child's splitting value. Splitting values may be used to determine which branch to traverse. For example, if outlook is a leftmost child of a node, the node's lmc_fval attribute would be 1. As is discussed in detail below, given an attribute value the lmc_fval may be used to identify a corresponding child node using the formula (fval−lmc_fval)+lmc_nid. This may reduce memory consumption while classifying large datasets.

"aid" may be an identifier for a given node's splitting attribute. Each attribute may be assigned an identifier, and that identifier may be stored with the nodes. For example, outlook may be assigned 1, temperature may be assigned 2, windy may be assigned 3, and humidity may be assigned 4. Since the decision node 100 in FIG. 1 splits based on outlook, the root node's aid in the database is 1.

"iscont" may be a binary or Boolean attribute which specifies whether a node's splitting attribute is continuous. For example, decision node 100 splits based on outlook, a discrete attribute, and iscont is therefore false. Decision node 106, however, splits based on humidity, a continuous attribute, and iscont is therefore true.

"sp_val" is the splitting value for a continuous attribute. For example, humidity is a continuous attribute split at 70, and therefore sp_val is equal to 70 for decision node 106 (nid 4). Using sp_val, samples may be divided by comparing the sample's attribute value to the decision tree's splitting value.

"tree_loc" may be an array containing the value for the splitting attributes from the root node to the present node. In an embodiment, the array at the root node is {0}. The maximum length of the array may be the decision tree's depth since the array may store the path from the root to the lowest leaf. Additionally or alternatively, ordering the table nodes by tree_loc may allow the tree to be traversed in depth first order in parallel. This parallel traversal may improve scalability by allowing compute nodes to be added or removed as needed.

"maxclass" is the predicted classification for a given node. For example, the maxclass for root node 100 (nid 1) is 2 (i.e. "play"). This attribute may be used during classification to predict which class a given sample is likely to fall into. In other words, from the root node, without considering or processing any sample values, it is more likely than not that the outcome will be "play." "maxclass" may be calculated during the training process from the training dataset. In the present example, maxclass is set to 2 for the root node because in the training set shown in Table 1 there are more 2's ("play") than there are 1's ("don't play"). Therefore, based on the training set, it is more likely that the outcome will be "play" than "don't play."

"prob" may be the percentage of samples from the training dataset with a class label equal to maxclass. This attribute may be used, for example, to determine the accuracy of the class prediction of the current node. For example, in the training set shown in Table 1 there are 14 samples. Nine of the sample are 2's ("play"). As a result, there is a 64.29% (=9/14) chance that the root node's maxclass prediction will be correct.

"node_size" is the number of training set samples represented by the current node. As a decision tree grows, the training set may be split into disjoint subsets. For example, root node 100 represents all 14 records in the training dataset. Four of the records result in "play" because they are overcast, five of the records are processed by decision node 104 because they are rainy, and five of the records are processed by decision node 106 because they are sunny. The node_size values of those nodes are therefore four, five, and five respectively.

"scv" may be an attribute's split criterion value. In some embodiments, scv represents the increase of information purity with the best split chosen in current node. For example, Information Gain ("IG"), Gini Index ("GI") or Gain Ratio ("GR") may be used to calculate an SCV. This attribute is addressed in detail below.

"dp_ids" may be an array, list, or other record containing the ids of discrete attributes chosen by the present node's ancestors for the best split. This attribute may allow certain attributes to be excluded from SCV calculations, as discussed below, and may provide a performance boost for large datasets.

The tree format presented in Table 2 may allow trees to grow level by level, rather than node by node. Split criterion values may be calculated in parallel for all the current leaf nodes, even when the nodes are in different trees in a random forest. As discussed below, these SCV's may be used to split the nodes, add new nodes and levels to the tree, and enter another round of tree growth. If the tree or random forest is distributed to multiple nodes in a parallel computing environment, these calculations may be performed in parallel.

Figure 2:
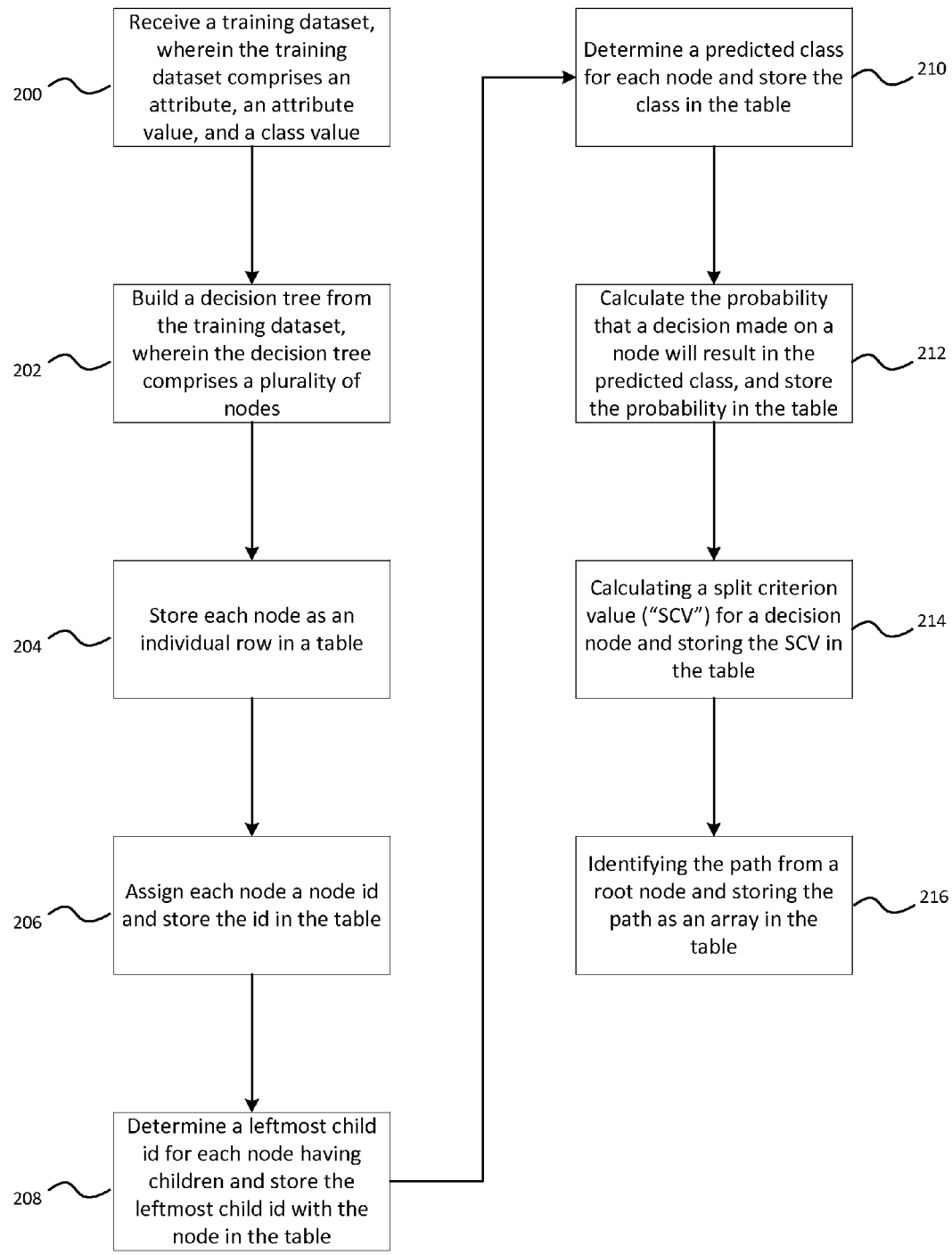
FIG. 2 depicts a method for representing a decision tree in a tabular format consistent with an embodiment of the present disclosure

FIG. 2 depicts a method for training a decision tree and storing it in a non-transitory computer readable medium, such as a database. At 200 a training set comprising an attribute, an attribute value, and a class value is received. Each attribute and the class label may contain a number of distinct values. At 202 a decision tree comprising a plurality of nodes is built from the training set. At 204, each node is stored as an individual row in a table. This table may be stored in a database table or in a computer file. At 206, each node is assigned a node id, such as nid, and stored in the table. At 208, the leftmost child for a node is identified and also stored in the table. This leftmost child could be, for example, stored as lmc_nid. At 210, a predicted class for each node is calculated and stored in the table. This predicted class could be, for example, maxclass. At 212, the probability a decision made by a given node will result in maxclass is calculated and stored in the table. At 214 the SCV value for a given node is calculated and stored in the table, and at 216 the path from the root node to the present node is calculated and stored in the table.

Dataset Classification

The tree format shown in Table 2 may allow datasets to be classified in parallel on a scalable environment. For example, once the decision tree is built it may be distributed to multiple nodes in a cluster. A classification dataset may be received, where the classification set is to be processed using the decision tree. The classification set shown in Table 3 will be used as an example. This classification dataset may split into segments, distributed to the nodes, and processed in parallel. Once all of the segments have been processed, the classified results may be joined together to form the final classified dataset.

TABLE 3

| id | outlook | temperature | humidity | windy |
|---|---|---|---|---|
| 1 | 3 | 85 | 85 | 1 |
| 2 | 3 | 80 | 90 | 2 |
| 3 | 1 | 83 | 78 | 1 |
| 4 | 2 | 70 | 96 | 1 |
| 5 | 2 | 68 | 80 | 1 |
| 6 | 2 | 65 | 70 | 2 |
| 7 | 1 | 64 | 65 | 2 |
| 8 | 3 | 72 | 95 | 1 |
| 9 | 3 | 69 | 70 | 1 |
| 10 | 2 | 75 | 80 | 1 |
| 11 | 3 | 75 | 70 | 2 |
| 12 | 1 | 72 | 90 | 2 |
| 13 | 1 | 81 | 75 | 1 |
| 14 | 2 | 71 | 80 | 2 |

Figure 3:
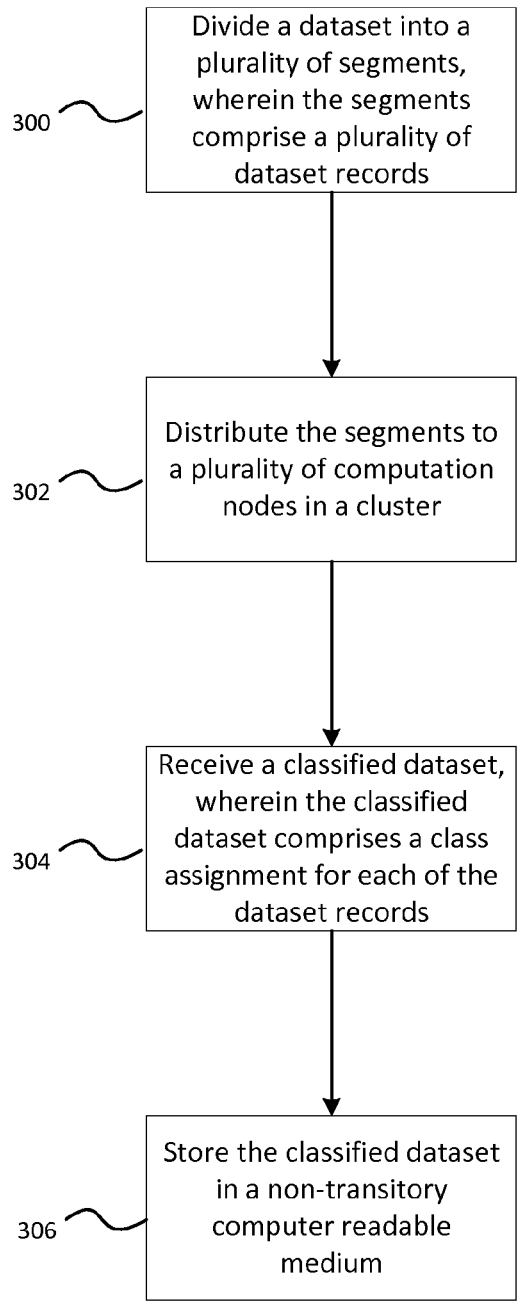
FIG. 3 depicts a method for classifying a dataset in parallel on a distributed architecture consistent with an embodiment of the present disclosure.

Turning to FIG. 3, a flowchart for classifying the datasets based on the tree format shown in Table 2 is discussed. At 300 a dataset, such as the dataset shown in Table 3, is divided into segments. The dataset may comprise a plurality of records, and in Table 3 these records are individual rows identified using the id column. At 302, the segments may be distributed to a plurality of nodes in a cluster, where they may be processed and the individual records may be classified. At 304, the classified datasets may be received, and at 306 they may be stored in a non-transitory computer readable storage medium.

Classification datasets may be received in any format and thereafter encoded for processing by the decision tree. This encoding may occur as soon as the dataset is received, or after it has been divided into segments and distributes to the compute nodes. In an embodiment, the dataset may be encoded to include a collection of records comprising the following elements: id, nid, avals, and class. Table 4 and Table 5 depict two segments of the classification dataset shown in Table 3 encoded in this manner.

TABLE 4

| id | nid | avals | class |
|---|---|---|---|
| 1 | 1 | {3, 85, 85, 1} | 2 |
| 2 | 1 | {3, 80, 90, 2} | 2 |
| 3 | 1 | {1, 83, 78, 1} | 2 |
| 4 | 1 | {2, 70, 96, 1} | 2 |
| 5 | 1 | {2, 68, 80, 1} | 2 |
| 6 | 1 | {2, 65, 70, 2} | 2 |
| 7 | 1 | {1, 64, 65, 2} | 2 |

TABLE 5

| id | nid | avals | class |
|---|---|---|---|
| 8 | 1 | {3, 72, 95, 1} | 2 |
| 9 | 1 | {3, 69, 70, 1} | 2 |
| 10 | 1 | {2, 75, 80, 1} | 2 |
| 11 | 1 | {3, 75, 70, 2} | 2 |
| 12 | 1 | {1, 72, 90, 2} | 2 |
| 13 | 1 | {1, 81, 75, 1} | 2 |
| 14 | 1 | {2, 71, 80, 2} | 2 |

In an embodiment, "id" is a unique identifier for a given record. "id" values may be unique within a given classification dataset, and in Tables 4 and 5 is encoded as integers one to fourteen.

During the classification process, records may move from node to node in the decision tree. "nid" may be the node id of record's current assignment. For example, in Tables 4 and 5 nid is set to one, the root node's nid. This is because the classification process has not yet started, or just started, and therefore all the records are assigned to the root. As the segments are processed and records move through the tree, nid will be updated to correctly identify the present node. Once a leaf node is reached, the record may be considered classified and does not need any further processing "avals" is an array, list, or other data structure that contains all the attribute values for a given record. In an embodiment, the array index corresponds to the attribute id, or aid, minus one. For example, outlook has an aid of 1, and is therefore stored at array index 0.

"class" may be the predicted classification for this record based on the present node. Note that even before the segments are distributed and/or processed, the class value may be set using the root node's maxclass value. Thus, the segments in Tables 4 and 5 have their class values equal to 2.

Pseudo code listing 1 depicts a method for classifying the dataset of Table 3 using the decision tree format shown in Table 2.

Listing 1:

```
1   BEGIN
2
3     R ← ∅;
4     L ← maxTreeDepth (T);
5
6     DISTRIBUTE C to the segments;
7     BROADCAST T to the segments;
8
9     FOREACH segment IN available segments DO IN PARALLEL
10
11       FOR l IN (1, 2, ..., L)
12         FOREACH (pair of <rec, node>) IN < C,T > (rec.nid=node.nid and node at level l)
13           IF (node.iscont)
14             rec.nid ← (rec.avals[node.aid]≤node.sp_val ? 1 : 2) + node.lmc_nid - node.lmc_fval;
```

-continued

Listing 1:

```
15        ELSE
16            rec.nid ← rec.avals[node.aid] + node.lmc_nid -
   node.lmc_fval;
17        END IF
18
19        rec.class ← node.maxclass;
20        IF (rec.nid is empty)
21            R←RU{<rec.id, rec.class>};
22        END IF
23      END FOR
24    END FOR
25  END FOR
26
27  RETURN R;
28 END
```

Pseudo code listing 1 may take T and C as input, where T may be a decision tree formatted in a manner similar to Table 2 and C is the dataset to be classified. C may be, for example, the dataset shown in Table 3 and formatted in a manner similar to Table 4 and Table 5. Pseudo code listing 1 may return classification set R as output.

At line 6, classification dataset C is divided into segments and distributed to nodes in the cluster. For example, the encoded datasets shown in Tables 4 and 5 may be distributed to multiple nodes in the cluster.

At line 7, decision tree T is also distributed to the nodes in the cluster. Additionally or alternatively, each node may store a local copy of T and no distribution may be necessary.

At line 9, the classification process begins and each segment is processed in parallel. For example, the segment shown in Table 4 may be processed at the same time as the segment shown in Table 5. Processing the segments in parallel may significantly reduce classification time.

In an embodiment, the records in the segments are classified level-by-level. For example, all the records receive a root level classification, followed by a first level classification, and so on until all the records are classified by a leaf node. Therefore, starting at line 11, the process iterates through every level of the decision tree until the maximum tree depth is reached. For example, the tree depth of the decision tree shown in FIG. 1 and encoded in Table 2 is three, and therefore each record will be processed at most three times. If a record lands on an outcome/leaf node before tree depth is reached, it may not require further processing.

At line 12, the process iterates through each record/node pair. For example, the first time the process runs every record will reside on the root node because the record's nid is equal to 1. Pairs may be identified by comparing the record's nid (column 2 in Tables 4 and 5) to the nid's stored in the decision tree (column 2 in Table 2). As a record is processed for each level of the tree, record's nid may change until a leaf node is reached.

At line 13, a check is made to determine whether the present node is a continuous or discrete attribute. For example, outlook is a discrete attribute so the first time the process runs this check will be false. If the present node represents a continuous attribute, the next node for the record is identified at line 14. In other words, the record is assigned a child node on the next level of the decision tree. If the present node is a discrete attribute, the next node may be determined at line 16.

If the present node represents a discrete attribute, at line 16 the next record node may be determined using the formula rec.avals[node.aid]+node.lmc_nid-node.lmc_foal. Table 6 and Table 7 show the results for this calculation after processing Table 4 and Table 5 respectively. Take the record with id 1 as an example. On the first iteration, record 1 is on the root node, which is the outlook node. Therefore, the outlook attribute value 3 ("sunny") is retrieved from the outlook index of the avals array. Note again the array indices may be ordered by aid, and therefore rec.avals[node.aid] is 3. The outlook value may be added to the root node's lmc_nid value, which equals 2, and subtracted from the root node's lmc_fval value, which equals 1. These values may be found in the decision tree shown in Table 2. As a result, the next node for this record is identified as 4 (=3+2−1). As shown in Table 2, the node with nid 4 is the humidity node, depicted as decision node 106 in FIG. 1. Since the value for "sunny" was codified as the digit 3, we know the next node is correct. This process may repeat for every record (possibly excluding those on leaf nodes) in every segment of the classification set until each has a new nid. This repetition may be seen in the new nid values stored in Table 6 and Table 7.

TABLE 6

| id | nid | avals | class |
|----|-----|-------|-------|
| 1  | 4   | {3, 85, 85, 1} | 1 |
| 2  | 4   | {3, 80, 90, 2} | 1 |
| 3  | 2   | {1, 83, 78, 1} | 2 |
| 4  | 3   | {2, 70, 96, 1} | 2 |
| 5  | 3   | {2, 68, 80, 1} | 2 |
| 6  | 3   | {2, 65, 70, 2} | 2 |
| 7  | 2   | {1, 64, 65, 2} | 2 |

TABLE 7

| id | nid | avals | class |
|----|-----|-------|-------|
| 8  | 4   | {3, 72, 95, 1} | 1 |
| 9  | 4   | {3, 69, 70, 1} | 1 |
| 10 | 2   | {2, 75, 80, 1} | 2 |
| 11 | 4   | {3, 75, 70, 2} | 1 |
| 12 | 2   | {1, 72, 90, 2} | 2 |
| 13 | 2   | {1, 81, 75, 1} | 2 |
| 14 | 3   | {2, 71, 80, 2} | 2 |

At line 14, a similar formula may be used to determine the next node for continuous attributes. Again, the formula will be discussed with reference to record 1, this time from Table 6. Record 1 is presently on node 4, the humidity node, so the check on line 13 will return true. Humidity is codified as 3, so rec.avals[node.aid] will return 95, the third value of the avals array. The splitting value 70 may be retrieved from node.sp_val, and a check is made to determine if the record value is less than or equal to the splitting value. If the check is true, a 1 is returned. If the check is false, a 2 is returned. Here, the value 95 is greater than the splitting value 70, and therefore the check returns a 2. The check value (2) is added to the nodes leftmost child nid (7) and subtracted from the leftmost child attribute value (1). The result is a next nid of 8, which happens to be a leaf node corresponding to the class "don't play."

Note that while record 1 is processed against the humidity nodes on the second iteration (i.e. second level) of the tree, other records will be processed against other nodes. For example, record 3 has a nid equal to 2, which is a leaf node corresponding to the classification "play." Similarly, record 4 has an nid equal to 3 is a discrete decision node for "windy." Tables 8 and 9 show the final outcome after the segments are processed on the second level of the decision tree.

TABLE 8

| id | nid | avals | class |
|---|---|---|---|
| 1 | 8 | {3, 85, 85, 1} | 1 |
| 2 | 8 | {3, 80, 90, 2} | 1 |
| 3 | 2 | {1, 83, 78, 1} | 2 |
| 4 | 5 | {2, 70, 96, 1} | 2 |
| 5 | 5 | {2, 68, 80, 1} | 2 |
| 6 | 6 | {2, 65, 70, 2} | 1 |
| 7 | 2 | {1, 64, 65, 2} | 2 |

TABLE 9

| id | nid | avals | class |
|---|---|---|---|
| 8 | 8 | {3, 72, 95, 1} | 1 |
| 9 | 7 | {3, 69, 70, 1} | 2 |
| 10 | 1 | {2, 75, 80, 1} | 2 |
| 11 | 7 | {3, 75, 70, 2} | 2 |
| 12 | 2 | {1, 72, 90, 2} | 2 |
| 13 | 2 | {1, 81, 75, 1} | 2 |
| 14 | 6 | {2, 71, 80, 2} | 1 |

At line 19 of pseudo code listing 1 the predicted class is assigned to the record's class attribute. In an embodiment, the predicted class may come from the present node's maxclass attribute. For example, the humidity node's maxclass attribute is 1, and therefore record 1 has a class attribute of 1 in Table 6. Storing the class at each level may be beneficial if the process is terminated prematurely. This may allow a class prediction even though the classification process did not finish.

At line 20 a check determines if the present node is a leaf node. If the check is true, the present class is the predicted class and may be added to the result set at line 21. Once every record reaches a leaf node, the classification process is complete and the segments may be joined together to form the final result set.

Figure 4:
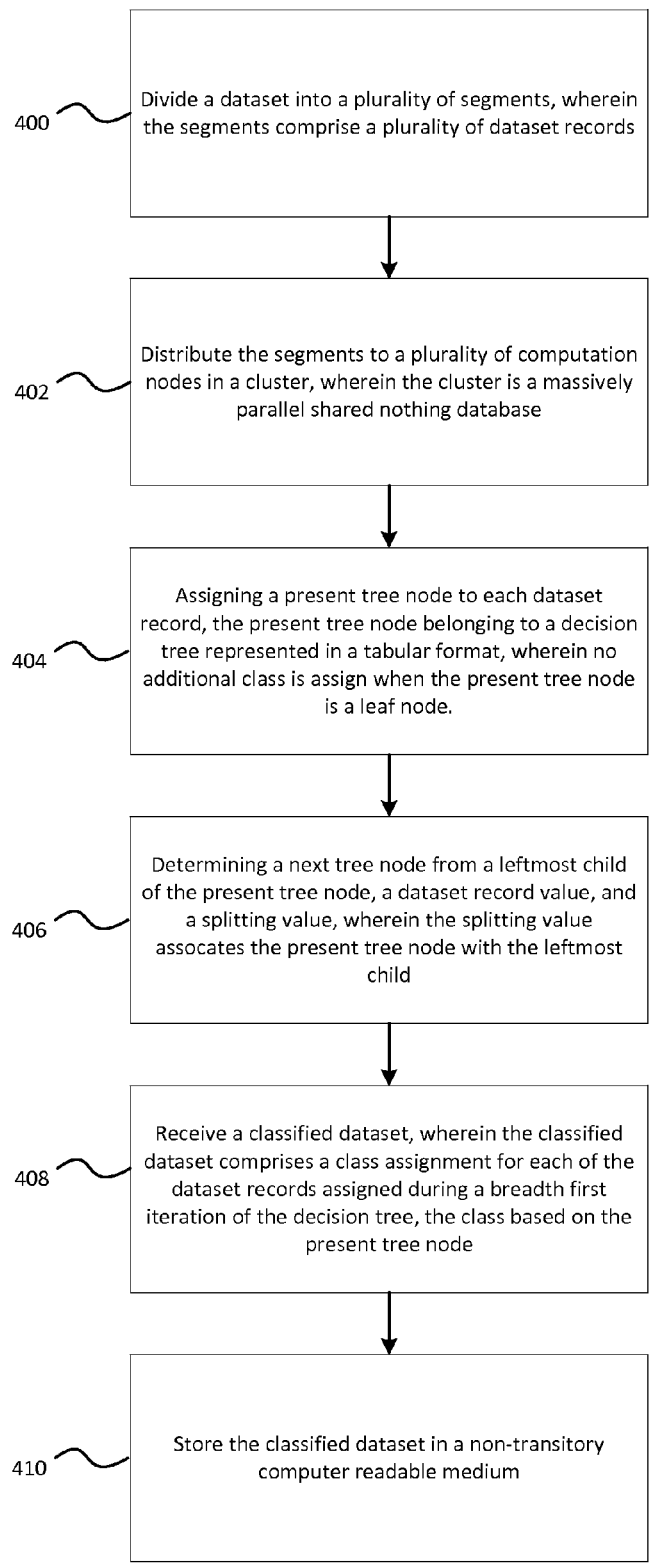
FIG. 4 depicts an additional or alternative method for classifying a dataset in parallel on a distributed architecture consistent with an embodiment of the present disclosure.

With reference to FIG. 4, a detailed method for classifying a dataset in parallel is discussed. At 400, a classification dataset may be divided into a plurality of segments comprising a plurality of records. For example, these segments may be similar to the segments shown in Tables 4 and 5.

At 402, the segments may be distributed to a plurality of computation nodes in a cluster, such as a MPP shared-nothing database.

At 404, each record may be assigned to a present tree node. For example, at that the start of the process all the records may be assigned to a root tree node. In an embodiment, the present tree node may be part of a decision tree stored in a tabular format, such as the format shown in Table 2.

At 406, a next tree node may be determined using the leftmost child of the present tree node, a dataset record value, and a splitting value. For example, the process shown in pseudo code Listing 1 may be used to determine a next tree node. In an embodiment, the splitting value may associate the present tree node with the leftmost child. For example, humidity decision node 106 shown in FIG. 1 has a splitting value of 70.

At 408, a classified dataset may be received. In an embodiment, the classified dataset may comprise a class assignment for each dataset record, where the assignments were made during a breadth first iteration of the tree. This may allow datasets to be classified level by level, rather than node by node.

Finally, at 410, the classified dataset may be stored in a non-transitory computer readable medium.

Attribute-Class-Statistics

As shown in the previous example, decision trees and random forests may be powerful classifications tools. Before datasets can be classified, however, the decision tree must be built and trained. For example, the decision tree shown in FIG. 1 and codified in Table 2 may be trained from the training dataset shown in Table 1. Part of the training process may involve generating attribute class statistics, such as counts of attribute/class pairs. These statistics may thereafter be used to calculate split criterion values and split nodes.

Generating ACS values may be memory intensive and therefore not suitable for big data. Additionally or alternatively, methods may treat continuous and discrete attributes differently, leading to complicated system architectures and computation intensive processes. The present discloser overcomes these challenges and presents an ACS solution for building decision trees that is memory and computationally efficient.

An ACS set may comprise a union of two subsets, as shown in Equation 1. One subset, $ACS_D$, may contain the attribute class statistics for all the discrete attributes in a training dataset. The other subset, $ACS_C$, may contain the attribute class statistics for the continuous attributes in the training dataset.

$$ACS = ACS_D \cup ACS_C \quad \text{Equation 1:}$$

The $ACS_D$ subset may comprise the statistical attributes shown in Equation 2. In Equation 2, $id_a$ may be an attribute id. For example, outlook may be codified as the digit 1, therefore $id_a$ for outlook statistics would also equal 1. "$v_a$" may comprise an attribute value. For example, outlook values "overcast," "rain," and "sunny" may be codified as numerals 1, 2, and 3, respectively. An ACS entry for "overcast" may therefore have a $v_a$ equal to 1. Element $c_{eq}$ may be the number of attribute/class pairs in a given training set. In some embodiments, this element may be an array or list of counts. For example, in the training set shown in Table 1 there are zero overcast/"don't play" pairs and four overcast/play pairs. "$c_{eq}$" may therefore equal {0,4}, where the first index is a count for "don't play" and the second index is a count for "play" (assuming $id_a$ equals 1 for outlook and $v_a$ equals 1 for overcast). Element $c_{total}$ may be a count of all the classes in the training dataset, and may be stored as an array or list. For example, the training set shown in Table 1 contains five "don't play" and nine "play" classes. Element $c_{total}$ may therefore equal {5,9}.

$$ACS_D = \{\ \langle id_a, v_a, c_{eq}, c_{total} \rangle \ | a \text{ is discrete}\} \quad \text{Equation 2:}$$

The $ACS_C$ subset may comprise the statistical attributes shown in Equation 3. Elements $id_a$, $v_a$, and $c_{total}$ may be substantially similar to those discussed in reference to $ACS_D$. Element $c_{le}$ may be the count of attribute/class pairs, where the attribute value is less than a splitting value. Counting the pairs may be particularly helpful because at the time ACS's are gathered, the splitting value is yet unknown.

$$ACS_C = \{\ \langle id_a, v_a, c_{le}, c_{total} \rangle \ | a \text{ is continuous}\} \quad \text{Equation 3:}$$

Storing ACS's in this manner may allow split criterion values to be calculated in an efficient and scalable manner, as discussed below. Additionally or alternatively, the presented structures may allow continuous ACS datasets and discrete ACS datasets to be stored in the same tabular format on a non-transitory computer readable medium, such as a database. For example, Table 10 shows an ACS dataset for the outlook and temperature attributes shown in training Table 1. Methods for generating this ACS table are discussed in detail below. In an embodiment, storing the discrete and continuous ACS's in a single table may reduce storage space requirements.

TABLE 10

| | aid | aval | le | total | iscont | nid | tid |
|---|---|---|---|---|---|---|---|
| 1 | 1 | 1 | {0,4} | {5,9} | false | 1 | 1 |
| 2 | 1 | 2 | {2,3} | {5,9} | false | 1 | 1 |
| 3 | 1 | 3 | {3,2} | {5,9} | false | 1 | 1 |
| 4 | 2 | 64 | {0,1} | {5,9} | true | 1 | 1 |
| 5 | 2 | 65 | {1,1} | {5,9} | true | 1 | 1 |
| 6 | 2 | 68 | {1,2} | {5,9} | true | 1 | 1 |
| 7 | 2 | 69 | {1,3} | {5,9} | true | 1 | 1 |
| 8 | 2 | 70 | {1,4} | {5,9} | true | 1 | 1 |
| 9 | 2 | 71 | {2,4} | {5,9} | true | 1 | 1 |
| 10 | 2 | 72 | {3,5} | {5,9} | true | 1 | 1 |
| 11 | 2 | 75 | {3,7} | {5,9} | true | 1 | 1 |
| 12 | 2 | 80 | {4,7} | {5,9} | true | 1 | 1 |
| 13 | 2 | 81 | {4,8} | {5,9} | true | 1 | 1 |
| 14 | 2 | 83 | {4,9} | {5,9} | true | 1 | 1 |
| 15 | 2 | 85 | {5,9} | {5,9} | true | 1 | 1 |

Table 10 may comprise the elements of Equation 1 and Equation 2. For example, Table 10 includes the following elements: aid, aval, le, total, iscont, nid, and tid. The table may describe the entire ACS set, regardless of whether the individual attributes are discrete or continuous. In an embodiment, an ACS dataset is generated for every node in a decision tree.

"aid" may be the id of a specific attribute. In an embodiment, aid corresponds to $id_a$ of Equation 1 and Equation 2.

"aval" may be an individual attribute's value. In an embodiment, discrete attributes may be encoded at integers. For example, discrete attribute oulook's values "overcast," "rain," and "sun" are encoded as 1, 2, and 3 respectively. Continuous attributes may be similarly encoded, or may already have a numerical value. In an embodiment, aval corresponds to $v_a$ in Equation 1 and Equation 2.

"le" may be a multi-purpose count attribute that corresponds to $c_{eq}$ for discrete attributes and $C_{le}$ for continuous attributes. This field may be represented as an array or list, where in the index of the array corresponds to a class label. For example, the first index may correspond to counts for the "don't play" class and the second index may correspond to counts for the "play" class. In some embodiments, the array size is equal to the total number of class labels; which is two in the present example. Additionally or alternatively, for discrete attributes the sum of the array elements may be the total number of records belonging to a class. For example, the sum of all the elements at the first index would be the total number of records belonging to the class "don't play;" which is five in the present example. The le attribute may allow attribute class statistics for both discrete and continuous attributes to be saved in the same format (e.g. an array with indices corresponding to classes and values equaling counts)

"total" may be an array that keeps the total count for each class label. In an embodiment, the array indices correspond to classes in a manner similar to the array stored in le. This element may, for example, correspond to $C_{total}$ in Equation 1 and Equation 2. In an embodiment, total may be used to identify the number of attribute values greater than a particular number using the equation total-le.

"iscont" may be a binary digit or Boolean flag indicating whether the present attribute is continuous. This element may be false for all records in $ACS_D$ and true for all records in $ACS_C$.

"nid" may be a node id used to identify the node to which this ACS belongs. In an embodiment, ACS datasets are generated for every node in a decision tree, and this attribute may allow them to all be stored in a common format and/or location.

"tid" may be an identifier for a given tree. This may be beneficial when multiple trees are trained simultaneously. If only one tree is being trained, this attribute may not be needed.

Figure 5:
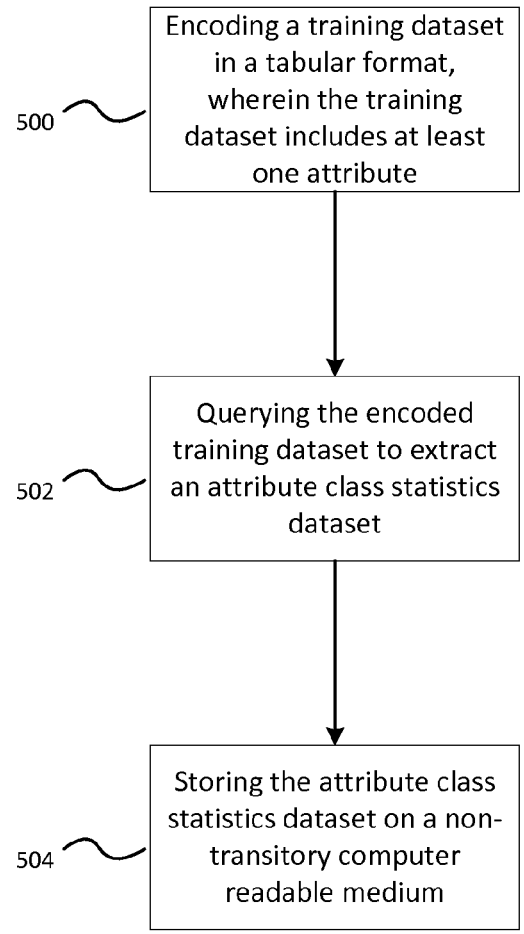
FIG. 5 depicts a method for deriving attribute class statistics consistent with an embodiment of the present disclosure.

Turning now to FIG. 5, a method for efficiently generating an ACS dataset from a training dataset is discussed. At 500, a training dataset may be encoded for processing. In an embodiment, the encoded training dataset may be substantially similar to the dataset shown in Table 11. At 502, the encoded dataset is queried to extract the ACS dataset, and at 504 the ACS dataset is stored to a non-transitory computer readable medium. In an embodiment, the final ACS dataset is substantially similar to Table 10. Additionally or alternatively, querying block 502 may be substantially similar to pseudo code Listing 2.

Table 11 is an example encoded dataset generated from the outlook and temperature attributes shown in Table 1. The humidity and windy attributes are excluded for ease of illustration; however they may also be encoded in a manner similar to Table 10. As a reminder, outlook may be a discrete attribute and temperature may be a continuous attribute.

TABLE 11

| Outlook | | | | | Temperature | | | | |
|---|---|---|---|---|---|---|---|---|---|
| aid | id | aval | iscont | class | aid | id | aval | iscont | class |
| 1 | 1 | 3 | false | 1 | 2 | 14 | 71 | true | 1 |
| 1 | 2 | 3 | false | 1 | 2 | 1 | 85 | true | 1 |
| 1 | 3 | 1 | false | 2 | 2 | 2 | 80 | true | 1 |
| 1 | 4 | 2 | false | 2 | 2 | 3 | 83 | true | 2 |
| 1 | 5 | 2 | false | 2 | 2 | 4 | 70 | true | 2 |
| 1 | 6 | 2 | false | 1 | 2 | 5 | 68 | true | 2 |
| 1 | 7 | 1 | false | 2 | 2 | 6 | 65 | true | 1 |
| 1 | 8 | 3 | false | 1 | 2 | 7 | 64 | true | 2 |
| 1 | 9 | 3 | false | 2 | 2 | 8 | 72 | true | 1 |
| 1 | 10 | 2 | false | 2 | 2 | 9 | 69 | true | 2 |
| 1 | 11 | 3 | false | 2 | 2 | 10 | 75 | true | 2 |
| 1 | 12 | 1 | false | 2 | 2 | 11 | 75 | true | 2 |
| 1 | 13 | 1 | false | 2 | 2 | 12 | 72 | true | 2 |
| 1 | 14 | 2 | false | 1 | 2 | 13 | 81 | true | 2 |

In Table 11, aid may be an attribute id. For example, outlook is codified as 1 and temperature is codified as 2. "id" may correspond to a record id. Since there are 14 records in the training dataset, there may be 14 records in a codified set. "aval" may be the value of a given attribute. For example, the first record's outlook value is 3 in Table 1, and therefore aval for that record is 3 in Table 11. "iscont" may be a binary or Boolean value representing whether the present attribute is continuous, and "class" may be the assigned class for the given record. It should be appreciated that while Table 10 is divided into separate columns for outlook and temperature, in practice these columns may be combined into a single table.

Table 11 may allow a system to efficiently generate ACS datasets in parallel. For example, Table 11 may be divided into segments and distributed to multiple compute nodes in a cluster. Each node may calculate ACS datasets for the provided segment, and these datasets may be joined together to form the final ACS dataset.

Additionally, the generation process may consume a constant amount of memory, rather than being proportional to the amount of data. For example, for a discrete attribute $c_{eq}$ may be generated by scanning the set and counting the number of attribute value/class pairs. Similarly, for a continuous attribute $c_{le}$ may be generated by counting the number of instances where the attribute value is less than a given value. Both counts may be made on a single scan of the table, thereby reducing resource requirements. Once the $c_{eq}$ and $c_{le}$ are determined, $c_{total}$ may be calculated from their counts. In an embodiment, this process is implemented using an SQL statement on a rational database or a MapReduce job on a platform such as Hadoop. Pseudo code listing 2 depicts a method for calculating the final ACS dataset and achieving these benefits.

Listing 2:

```
1   SELECT aid, aval, iscont,
2     CASE WHEN (iscont)
3       sum(le) OVER
4         (PARTITION BY aid ORDER BY aval ROWS BETWEEN
5          UNBOUNDED PRECEDING AND CURRENT ROW)
6     ELSE
7       le
8     END AS le,
9
10    sum(le) OVER
11      (PARTITION BY aid
12      ROWS BETWEEN UNBOUNDED PRECEDING AND
13      UNBOUNDED FOLLOWING) AS total
14  FROM (
15    SELECT aid, aval, array_agg(class-1, count) as le, iscont
16    FROM (
17      SELECT aid, aval, is_cont, class, count (*) as count
18      FROM encoded_golf
19      GROUP BY aid, aval, iscont, class
20    )
21  )
```

Pseudo code listing 2 provides an SQL statement consistent with an embodiment of the present disclosure. The ACS dataset may be generated from three nested SELECT statements on lines 1, 15, and 17. These statements will be discussed in order of execution, starting with the inner-most statement.

On lines 17-19, the aid, aval, isconst, and class attributes are extracted from an encoded dataset, such as the dataset shown in Table 11. In an embodiment, the encoded dataset is scanned only one time per cluster node. This may reduce resource requirements as the training dataset may not need to be queried a second time.

The attributes returned from the encoded dataset may be grouped by aid, aval, isconst, and class, as shown in Table 12. In an embodiment, a count attribute may store the number of records falling into each group. For example, three records in Table 11 have an aid value of 1, aval value of 3, iscont value of false, and class value of 1. The first entry in Table 12 therefore has a count value of 3. The count may be determined for each entry in Table 12. In an embodiment, the count is calculated as records are pulled from the encoded dataset rather than after they have been grouped together.

TABLE 12

| aid | aval | iscont | class | count |
|-----|------|--------|-------|-------|
| 1 | 3 | false | 1 | 3 |
| 1 | 1 | false | 2 | 4 |
| 1 | 2 | false | 2 | 3 |
| 1 | 2 | false | 1 | 2 |
| 1 | 3 | false | 2 | 2 |
| 2 | 85 | true | 1 | 1 |
| 2 | 80 | true | 1 | 1 |
| 2 | 83 | true | 2 | 1 |
| 2 | 70 | true | 2 | 1 |
| 2 | 68 | true | 2 | 1 |
| 2 | 65 | true | 1 | 1 |

TABLE 12-continued

| aid | aval | iscont | class | count |
|-----|------|--------|-------|-------|
| 2 | 64 | true | 2 | 1 |
| 2 | 72 | true | 1 | 1 |
| 2 | 69 | true | 2 | 1 |
| 2 | 75 | true | 2 | 2 |
| 2 | 72 | true | 2 | 1 |
| 2 | 81 | true | 2 | 1 |
| 2 | 71 | true | 1 | 1 |

Once the encoded training set has been scanned on lines 17-19, the count and class information may be aggregated together at line 15. In an embodiment, the SELECT statement on line 15 may result in a table as shown in Table 13. An le column may be formed by aggregating count values into an array, where the index of the array is a class label. In other words, the first index in the array may be the count of aid/aval pairs having a class equal to 1, and the second index may be the same pairs where the class equals 2. For example, in Table 12, where aid equals 1, aval equal 3, and class equals 1, the count is 3. Therefore, in Table 13, the first le array index where aid equals 1 and aval equals 3 will be 3. Similarly, in Table 12, where aid equals 1, aval equal 3, and class equals 2, the count is 2. Therefore, in Table 13, the second le array index where aid equals 1 and aval equals 3 will also be 2.

In an embodiment, a fixed amount of memory may be allocated to the le array and all the elements may be initialized to zero. This may provide two benefits. First, the memory size may be known and constant. As a result, the memory consumed may not be proportionate to the amount of data processed. Additionally or alternatively, initializing the array to zero means that if an attribute value/class pair does not appear in the training set, the count is set to zero automatically.

TABLE 13

| aid | aval | iscont | le |
|-----|------|--------|-----|
| 1 | 3 | false | {3, 2} |
| 1 | 1 | false | {0, 4} |
| 1 | 2 | false | {2, 3} |
| 2 | 85 | true | {1, 0} |
| 2 | 80 | true | {1, 0} |
| 2 | 83 | true | {0, 1} |
| 2 | 70 | true | {0, 1} |
| 2 | 68 | true | {0, 1} |
| 2 | 65 | true | {1, 0} |
| 2 | 64 | true | {0, 1} |
| 2 | 72 | true | {1, 1} |
| 2 | 69 | true | {0, 1} |
| 2 | 75 | true | {0, 2} |
| 2 | 81 | true | {0, 1} |
| 2 | 71 | true | {1, 0} |

Once the count and class attributes are aggregated into an array, the final le and total columns may be calculated. The result may be a table substantially similar to Table 10. In an embodiment, le may correspond to $c_{eq}$ in Equation 1 and $c_{le}$ in Equation 2. Similarly, total may be $c_{total}$ in Equation 1 and/or Equation 2.

At line 2, a check is made to determine whether a given record is continuous. If the check is false, the record is for a discrete attribute and le does not need any further processing. If the check is true, the record is for a continuous attribute le may be calculated on lines 3-5.

To calculate le for a record belonging to a continuous attribute, the sum of the le attribute of all the previous rows is added to the present row. For example, in Table 10 the le value for the first temperature attribute, shown on row 4, is {0,1}.

The next attribute has a value of {1,1}, because its le value in Table 13 ({1,0}) is added to the preceding row ({0,1}). Similarly, row 6 in Table 10 is {1,2}, which is equal to {0,1} +{1,0}+{0,1}.

Once the le column is calculated for each distinct value of all the attributes, the total column may be calculated by summing together all the le arrays from Table 13. In the present example, the total value is {5,9}. Looking at the training set in Table 1, we see there are 5 records categorized as class 1, and 9 entries categorized as class 2. The count values and class associations in the total array are therefore correct.

In some embodiments, Tables 10, 12, and/or 13 are not materialized. These tables may be generated and provided straight to an SCV algorithm, as discussed in detail below.

In some embodiments, the generated ACS may be smaller than the original encoded dataset both in row size and byte size. As a result, network bandwidth may be saved while computing the ACS in a clustered environment. Additionally or alternatively, if the ACS is saved to a non-transitory computer readable storage medium it may take less space than the training set does.

Figure 6:
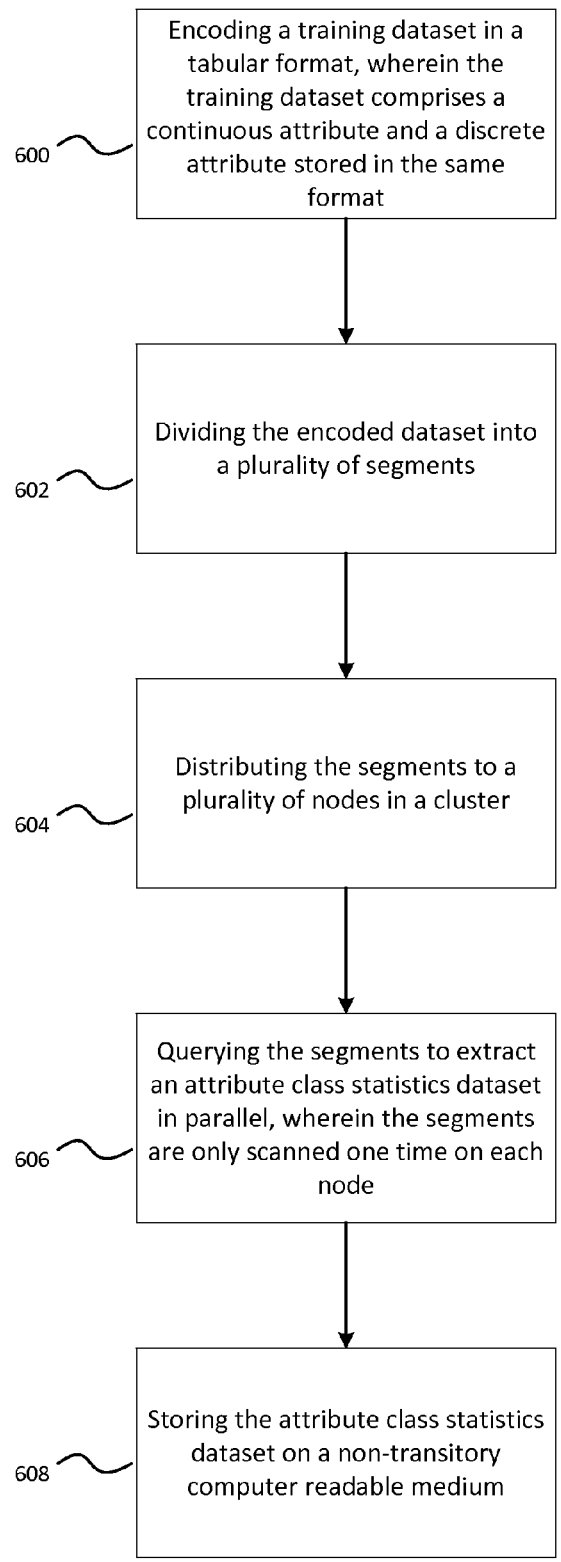
FIG. 6 depicts a method for deriving attribute class statistics on a distributed architecture consistent with an embodiment of the present disclosure.

With reference now to FIG. 6, a method for generating and storing attribute class statistics is discussed. At 600, a training dataset is encoded into a tabular format. This encoded dataset could be, for example, the training dataset shown in FIG. 11. In an embodiment, the encoded training dataset may include both continuous and discrete attributes.

At 602, the dataset may be divided into a plurality of segments, and at 604 these segments may be distributed to nodes in a cluster.

At 606, the segments may be queried in parallel to extract ACS's. For example, pseudo code Listing 2 may be used to extract the information. In an embodiment, the segments are only scanned once for each node in the cluster.

At 608, the resulting ACS datasets may be joined and stored on a non-transitory computer readable storage medium. The resultant dataset could be, for example, the dataset shown in Table 10.

Figure 7:
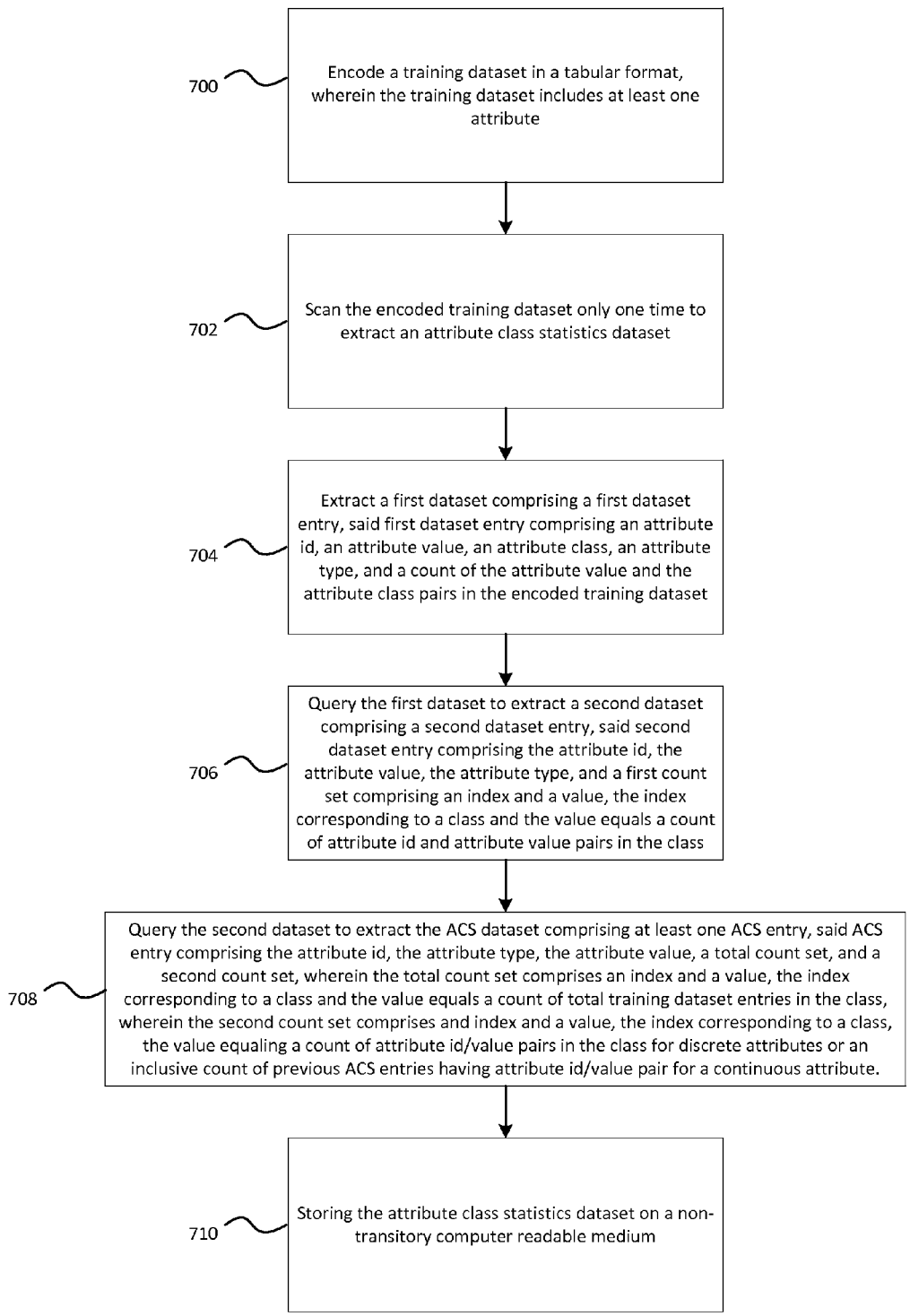
FIG. 7 depicts an additional or alternative method for deriving attribute class statistics on a distributed architecture.

Turing now to FIG. 7, an additional or alternative process for calculating ACS's is discussed. At 700, a training dataset is encoded into a tabular format, such as Table 11. At 702, the encoded dataset is scanned once to extract an ACS dataset. This extraction process could be, for example, similar to pseudo code listing 2. In an embodiment, blocks 702-08 are part of the extraction process.

At 704, a first dataset comprising a dataset entry including an attribute id, attribute value, attribute class, attribute type, and count of attribute value/class pairs may be extracted from the encoded dataset. In an embodiment, this may be similar to the select query on lines 17-19 of pseudo code Listing 2. In an embodiment, the first dataset may be similar to Table 12.

At 706, a second dataset may be extracted from the first dataset. This second dataset may comprise the attribute id, attribute value, attribute type, and a first count set. The count set may comprise an array with an index and a value, where the index corresponds to a class and the value equals a count of attribute id/values pairs in the class. For example, block 706 may be performed by the SELECT statement on line 15 of pseudo code Listing 2. In an embodiment, the second dataset may be similar to Table 13.

At 708, the second dataset may be queried to extract the ACS dataset. The ACS dataset may comprise an attribute type (aid), attribute value (aval), a total count set (total), and a second count set (le). In an embodiment, the second count set may include an index and a value, where for discrete attributes the index corresponds to a class and the value equals the count of attribute/id pairs in that class, and for continuous attributes the index corresponds to a class and the value equals an inclusive count of previous ACS entries having attribute id/value pairs. For example, block 708 may correspond to lines 1-13 of pseudo code Listing 2. In an embodiment, the ACS dataset may be similar to Table 10 where the second count is the le column.

Finally, at 710, the ACS dataset may be stored in a non-transitory computer readable storage medium.

Calculating Split Criterion Values

Split criterion values ("SCV's") may be used to determine the best split attribute for a given node on a decision tree. For example, the best splitting attribute for the decision node 106 is the continuous attributes humidity with splitting value 70. Calculating these values may be computationally intensive, however, particularly for big data training sets that may contain terabytes or petabytes of data.

In an embodiment, the ACS structure developed above may be used to calculate split criterion values for given attributes. By using the above structure and the processes discussed below, SCV's may be calculated in parallel on multiple cluster nodes for all attributes on all the trees being trained. In some embodiments, the calculations may be based on Information Gain, Gain Ratio, or Gini Index. Additionally or alternatively, the present solution may allow the calculation to consume a constant amount of memory, which may facilitate calculations for big data in a cluster environment.

Figure 8:
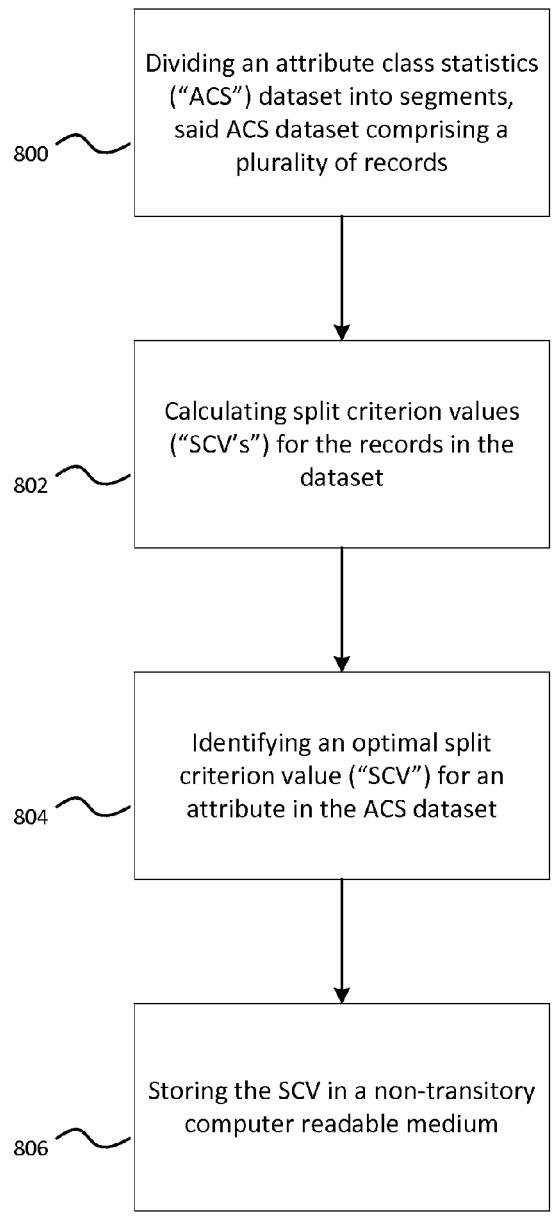
FIG. 8 depicts a method for calculating split criterion values consistent with an embodiment of the present disclosure.

FIG. 8 shows a method for calculating SCV's in parallel, consistent with an embodiment of the present disclosure. At 800, the ACS data may be divided into segments, and may thereafter be distributed to compute nodes in a cluster. The ACS data may be substantially similar to Table 10. In an embodiment, each segment contains all the data necessary to calculate an SCV for a discrete attribute or an SCV for a splitting value of a continuous attribute. For example, one segment may contain rows 1-3 which represent outlook, a discrete attribute. These three rows may contain all the information necessary to calculate an SCV for outlook, which may be based on the attribute as a whole rather than unique attribute values. Continuous attribute, in contrast, may receive an SCV for each unique value. Thus, rows 4-15 may each be divided into separate segments, or, in an embodiment, may be joined to form some subset of segments. For example, rows 4-8 may be in one segment, and rows 9-15 may be in a second segment.

At 802, SCV's for the attributes of each tree node in a dataset may be calculated. For discrete attribute, only one SCV may be calculated. For continuous attributes, each unique attribute value in the segment may receive its own SCV. For example, attribute value 64 on row 4 of Table 10 may receive an SCV independent of attribute value 65 on row 5. These values may be based on IG, GR, or GI.

At 804, an optimal SCV for each tree node in the dataset is identified. For a continuous attribute, the optimal SCV may the SCV with the largest value. That attribute value may thereafter be used as the splitting value of the attribute on the present node. For example, the attribute value 70 has the highest SCV for humidity node 106 when calculated using IG, and therefore 70 is humidity's splitting value.

At 806, the SCV's are stored in a non-transitory computer readable medium, such as a file or database table. In an embodiment, the SCV may be stored in a format similar to Table 2 above.

As noted above, calculating SCV's for large datasets may be memory intensive. Traditional IG, GR, or GI formulas may not scale efficiently for large datasets. The present disclosure presents a novel transformation of these formulas which may allow SCV's to be calculated using a constant amount of memory.

Equation 3 shows a transformation of the traditional IG formula into a new equation four variables, namely t, u, w, and v.

$$IG(S, a) = \text{info}(S) - \text{info}(S, a)$$

$$= -\sum_{j=1}^{m} \frac{c_j}{|S|} \log_2 \frac{c_j}{|S|} + \sum_{i=1}^{n} \frac{|S_i|}{|S|} \sum_{j=1}^{m} \frac{c_{i,j}}{|S_i|} \log_2 \frac{c_{i,j}}{|S_i|}$$

$$= \log_2 |S| - \frac{1}{|S|}$$

$$\left( \sum_{j=1}^{m} c_j \log_2 c_j - \sum_{i=1}^{n} \sum_{j=1}^{m} c_{i,j} \log_2 c_{i,j} + \sum_{i=1}^{n} |S_i| \log_2 |S_i| \right)$$

$$= \log_2 t - \frac{u - w + v}{t}$$

Equation 3 where $$t = |S|; u = \sum_{j=1}^{m} c_j \log_2 c_j; v = \sum_{i=1}^{n} |S_i| \log_2 |S_i|;$$

$$w = \sum_{i=1}^{n} \sum_{j=1}^{m} c_{i,j} \log_2 c_{i,j}$$

As shown in Equation 3 and Equation 4, the IG for sample S with attribute a may be represented as a function of four components: t, u, w, and v. Note that Equation 4 is the result of the transformation process shown in Equation 3, and is shown separately for ease of reference.

$$IG(S, a) = \log_2 t - \frac{u - w + v}{t}$$

Equation 4

In Equations 3 and 4, t may equal the sum of all the elements in the array total from Table 10, which is the value of $C_{total}$ in Equations 1 and 2. For example, for every record in the ACS's shown in Table 10, t would equal 14 (=5+9). "t" therefore equals the total number of records in the original training set, shown in Table 1.

In Equations 3 and 4, for u, the $c_j$ variable may be an element in the array total. For example, with reference to Table 10, the value for u for every entry in the table may be (($5 \log_2 5) + (9 \log_2 9$)).

Again in reference to Equations 3 and 4, for v where the present attribute is discrete, $|S_i|$ may be the sum of all the elements of the array le, which may be $c_{eq}$ in Formula 1. For example, $|S_i|$ on Table 10, row 1, may be (0+4). The v value for row 1 would therefore be (4 $\log_2$ 4). For v where the present attribute is continuous, $|S_i|$ may be the number of attributes values less than or equal to the present attribute value, obtained from sum of the le array, or the number of attributes values greater than the present attribute value, obtained by subtracting the sum of the le array from the sum of the total array. For example, Equation 5 shows the value of v for the ACS of a continuous attribute on row 11 of Table 10.

$$v = (3+7) \log_2(3+7) + ((5+9) - (3+7)) \log_2((5+9) - (3+7))$$

Equation 5:

Finally, in Equations 3 and 4, for w, the $c_{i,j}$ variable may reference a specific element of the le array. For example, for the discrete record stored in row 2 of Table 10, w would equal (($2 \log_2 2) + (3 \log_2 3$)).

SCV's for discrete attributes may be calculated for the attribute as a whole. For example, rows 1-3 of Table 10 represent ACS's for outlook, a discrete attribute. Therefore these rows may be processed together and only one SCV will be calculated for the whole. Since the values in the total column do not change, for this dataset t will always equal 14 and u will always equal (($5 \log_2 5) + (9 \log_2 9$)). Since outlook is discrete, however, the values of v and w may be an aggregate of all the v and w values for every outlook entry (i.e. rows 1-3). For example, the value of v is shown by Equation 6 and the value of w is shown by Equation 7.

$$v = (4 \log_2 4) + (5 \log_2 5) + (5 \log_2 5)$$

Equation 6:

$$w = (4 \log_2 4) + (2 \log_2 2 + 3 \log_2 3) + (3 \log_2 3 + 2 \log_2 2)$$

Equation 7:

In contrast to discrete attribute, continuous attributes may receive an SCV for each distinct attribute value. Aggregating v and w value may therefore not be necessary.

Given the ACS structure shown in Table 10 and the IG formula shown in Equation 4, a system may calculate IG using a constant amount of memory. Specifically, the system may only need enough memory to calculate and retain intermediate values of t, u, v, and w. In some embodiments, this may be the amount of memory needed to retain a single ACS record. As new records are loaded, the old records may be released, and the memory required may therefore be constant. This may stand in contrast to traditional IG calculation methods which may require an entire training dataset to be memory resident.

Pseudo code listing 3 shows a method for calculating information gain based on Equation 4. The calcIG function on lines 1-15 may be the main function that calls the calcIGstep function on lines 17-52. The calcIGstep function may be used to calculate the values of t, u, v, and w, which are discussed in detail above with reference to Equation 4.

Listing 3:

```
1    calcIG (S)
2
3       INPUT
4          S An ACS_U set
5       OUTPUT
6          The SCV calculated from the ACS_U set
7       BEGIN
8          (t, u, v, w) ← (0.0, 0.0, 0.0, 0.0);
9          WHILE (S.EOF) LOOP
10             r ← read a record from S;
11             (t, u, v, w) += calcIGstep (r);
12         END LOOP
13
14         RETURN log_2 t − (u − w + v) / t;
15      END
16
17   calcIGstep (r)
18
19      INPUT
20         r A record(aid, aval, iscont, le, gt) from an ACS set
21         c The number of distinct class labels
22      OUTPUT
23         (t, u, v, w)
24      BEGIN
25         x ← 0;
26         IF (r.iscont)
27
28            // Continuous attribute
29            FOR (i = 0; i < c; ++i)
```

-continued

Listing 3:

```
30          t += r.total[i]
31          x += r.le[i];
32          u += r.total[i] * log2(r.total[i]);
33          w += r.le[i] * log2(r.le[i]);
34        END FOR
35        v += (x) * log2(x) + (t - x) * log2(t - x);
36      ELSE
37
38        // Discrete attribute
39        IF (0 == t)
40          FOR (i = 0; i < c; ++i)
41            t += r.total[i]
42            u += r.total[i] * log2(r.total[i]);
43          END FOR
44        END IF
45        FOR (i = 0; i < c; ++i)
46          x += r.le[i];
47          w += r.le[i] * log2(r.le[i]);
48        END FOR
49        v += x * log2(x);
50      END IF
51      RETURN (t, u, v, w)
52    END
```

The parallel processing and/or memory advantage may also be achieved using a manipulation of GR equation. Equation 8 shows a modified GR equation, where t, u, v, and w may be calculated as discussed above. For example, in a pseudo code Listing 3 only line 14 would need to change to use GR instead of IG.

$$GR(S, a) = IG(S, a) / IV(S, a) \quad \text{Equation 8}$$

$$= \frac{\left(\sum_{j=1}^{m} c_j \log_2 c_j - \sum_{i=1}^{n} \sum_{j=1}^{m} c_{i,j} \log_2 c_{i,j} + \sum_{i=1}^{n} |S_i| \log_2 |S_i|\right)}{\frac{1}{|S|}\left(|S| \log_2 |S| - \sum_{i=1}^{n} |S_i| \log_2 |S_i|\right)}$$

$$= 1 - \frac{u - w}{t \log_2 t - v}$$

A manipulation of the GI formula may also be used to calculate SCV's in a parallel and memory efficient manner, however it may require a few additional calculations. Equation 9 shows a manipulated GI equation consistent with an embodiment of the present disclosure.

$$GI(S, a) = 1 - \sum_{j=1}^{m}\left(\frac{c_j}{|S|}\right)^2 - \left(1 - \sum_{i=1}^{n} \frac{|S_i|}{|S|} \sum_{j=1}^{m}\left(\frac{c_{i,j}}{|S_i|}\right)^2\right) \quad \text{Equation 9}$$

$$= \frac{1}{t}\sum_{i=1}^{n}\frac{w_i}{v_i} - \frac{u}{t^2}$$

$$= \frac{w}{t} - \frac{u}{t^2}$$

where $t = |S|$; $u = \sum_{j=1}^{m} c_j^2$; $w_i = \sum_{j=1}^{m} c_{i,j}^2$; $v_i = |S_i|$;

$$w = \sum_{i=1}^{n} \frac{w_i}{v_i}$$

According to Equation 9, t may be the sum of the elements in the total array, which may be calculated from $c_{total}$ in Equation 2 and Equation 3. In the present example, t would equal 14.

In Equation 9, for u, $c_j$ may be the individual elements of the total array. Therefore, u would be the sum of the square of these elements. In the present example, u would equal $5^2 + 9^2$ for all records.

In Equation 9, w may be calculated from v. Variable v, in turn, will be calculated differently based on attribute type (i.e. continuous or discrete).

For discrete attributes, v may equal the sum of the elements in the le array and must be calculated for each distinct attribute value. For example, for row 1 in Table 10 (v=4), for row 2 (v=2+3), and for row 3 (v=3+2). Since the first three rows represent outlook, a discrete value, v must be calculated for each row.

For discrete attributes, $w_i$ may be the value of the elements of the le attributes squared. Variable w may thereafter be found from the sum of $w_i/v$ for each row. For example, Equation 10 shows the value of w for the discrete attribute outlook.

$$v = 0 + 4; \; w_1 = \frac{0^2}{v} + \frac{4^2}{v} \quad \text{Equation 10}$$

$$v = 2 + 3; \; w_2 = \frac{2^2}{v} + \frac{3^2}{v}$$

$$v = 3 + 2; \; w_2 = \frac{3^2}{v} + \frac{2^2}{v}$$

$$w = w_1 + w_2 + w_3$$

For continuous attributes, w may be calculated using two values of v. The first value may by the number of records less than or equal to the present split value, calculated from the sum of the elements in an le array, and the second value may be the number of records greater than the present splitting value, calculated by subtracting the sum of le array from the sum of the total array. For example, Equation 11 shows the v values calculated from the ACS's found in row 11 of Table 10, and Equation 12 shows the w value.

$$(v_1, v_2) = ((3+7), (5+9-(3+7))) \quad \text{Equation 11:}$$

$$w = \left(\frac{3^2}{v_1} + \frac{7^2}{v_1}\right) + \left(\frac{(5-3)^2}{v_2} + \frac{(9-7)^2}{v_2}\right) \quad \text{Equation 12}$$

Figure 9:
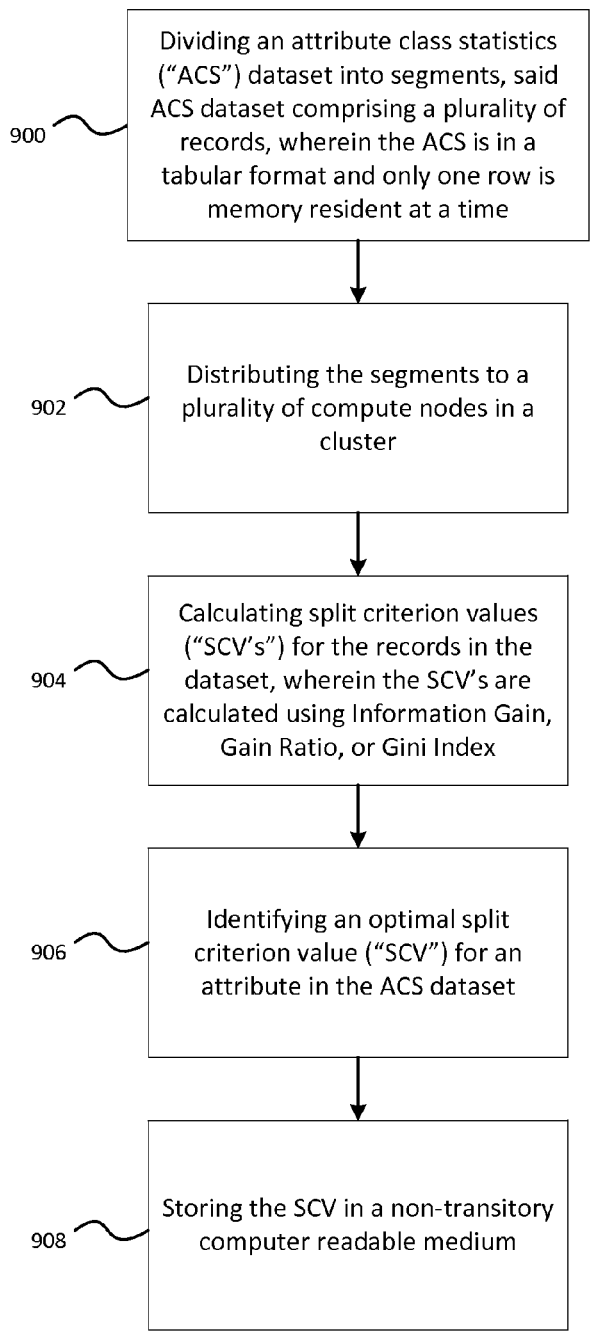
FIG. 9 depicts a method for calculating split criterion values in parallel on a distributed architecture consistent with an embodiment of the present disclosure.

With reference to FIG. 9, a flowchart depicting a method for calculating SCV's consistent with the present disclosure is discussed. At 900, an ACS dataset may be divided into segments, wherein the ACS dataset comprises a plurality of records. Additionally or alternatively, the ACS dataset may be in a tabular format, and only one row may be memory resident during processing.

At 902, the segments may be distributed to a plurality of compute nodes in a cluster. At 904, SCV's may be calculated for the attributes of each node, wherein the SCV's are calculated using IG, GR, or GI. In an embodiment, the SCV's may be calculated using the manipulated formulas discussed above.

At 906, an optimal SCV for each node in the ACS dataset may be identified, and at 908 the value may be stored in a non-transitory computer readable medium. In an embodiment, the SCV may be stored in a tree format such as the one discussed above in reference to Table 2.

Throughout this disclosure, reference is made "less than or equal to" checks. These references are made for ease of description, and are not meant to be limiting. For example, embodiments performing "less than," "greater than," "greater than or equal to," or any similar check are consistent with the present disclosure.

For the sake of clarity, the processes and methods herein have been illustrated with a specific flow, but it should be understood that other sequences may be possible and that some may be performed in parallel, without departing from the spirit of the invention. Additionally, steps may be subdivided, combined, or performed in an alternate order. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for representing a decision tree in a table, comprising:
   receiving a training dataset;
   building a decision tree from the training dataset, wherein the decision tree comprises a plurality of nodes;
   storing each node as an individual row in the table on a non-transitory computer readable medium, wherein the row comprises a leftmost child id, a split criterion value ("SCV"), and a path from a root node;
   distributing the decision tree to multiple nodes in a massive parallel processing ("MPP") database cluster;
   receiving a classification dataset to be classified using the decision tree;
   dividing the classification dataset into a plurality of segments; and
   distributing the segments to the multiple nodes in the MPP database cluster.

2. The method of claim 1, further comprising assigning each node a node id and storing the node id in the table.

3. The method of claim 1, further comprising determining the leftmost child id for each node having children and storing the leftmost child id with the node in the table.

4. The method of claim 1, further comprising determining a predicted class for each node and storing the predicted class in the table.

5. The method of claim 4, further comprising calculating the probability that a decision made on a node will result in the predicted class, and storing the probability in the table.

6. The method of claim 1, further comprising calculating the SCV for a decision node in the decision tree and storing the SCV in the table.

7. The method of claim 1, further comprising storing the path from the root node and storing the path as an array in the table.

8. The method of claim 1, wherein the training dataset comprises an attribute, an attribute value, and a class value.

9. A computer program product for representing a decision tree in a database, comprising a non-transitory computer readable medium having program instructions embodied therein for:
   receiving a training dataset;
   building a decision tree from the training dataset, wherein the decision tree comprises a plurality of nodes;
   storing each node as an individual row in the table on a non-transitory computer readable medium, wherein the row comprises a leftmost child id, a split criterion value ("SCV"), and a path from a root node;
   distributing the decision tree to multiple nodes in a massive parallel processing ("MPP") database cluster;
   receiving a classification dataset to be classified using the decision tree;
   dividing the classification dataset into a plurality of segments; and
   distributing the segments to the multiple nodes in the MPP database cluster.

10. The computer program product of claim 9, further comprising assigning each node a node id and storing the node id in the table.

11. The computer program product of claim 9, further comprising determining the leftmost child id for each node having children and storing the leftmost child id with the node in the table.

12. The computer program product of claim 9, further comprising determining a predicted class for each node and storing the predicted class in the table.

13. The computer program product of claim 12, further comprising calculating the probability that a decision made on a node will result in the predicted class, and storing the probability in the table.

14. The computer program product of claim 9, further comprising the SCV for a decision node in the decision tree and storing the SCV in the table.

15. The computer program product of claim 9, further comprising storing the path from a root node to each node and storing the path as an array in the table.

16. The computer program product of claim 9, wherein the training dataset comprises an attribute, an attribute value, and a class value.

17. A system for representing a decision tree in a database comprising a non-transitory computer readable medium and a processor configured to:
   receive a training dataset;
   build a decision tree from the training dataset, wherein the decision tree comprises a plurality of nodes;
   store each node as an individual row in the table on a non-transitory computer readable medium, wherein the row comprises a leftmost child id, a split criterion value ("SCV"), and a path from a root node;
   distribute the decision tree to multiple nodes in a massive parallel processing ("MPP") database cluster;
   receive a classification dataset to be classified using the decision tree;

divide the classification dataset into a plurality of segments; and distribute the segments to the multiple nodes in the MPP database cluster.

18. The system of claim 17, further comprising determining the leftmost child id for each node having children and storing the leftmost child id with the node in the table.

19. The system of claim 17, further comprising determining a predicted class for each node and storing the predicted class in the table.

20. The system of claim 19, further comprising calculating the probability that a decision made on a node will result in the predicted class, and storing the probability in the table.

* * * * *